United States Patent [19]
Bernier

[11] 3,884,551
[45] May 20, 1975

[54] STEREO VIEWER FOR A PAIR OF ARCUATE STEREO IMAGE STRIPS

[75] Inventor: Robert V. Bernier, Saugus, Calif.
[73] Assignee: TRW Inc., Cleveland, Ohio
[22] Filed: Nov. 28, 1973
[21] Appl. No.: 419,525

[52] U.S. Cl. .............................................. 350/142
[51] Int. Cl. .......................................... G02b 25/00
[58] Field of Search ............................ 350/133, 142

[56] References Cited
UNITED STATES PATENTS
2,484,591   10/1949   Rochwite ....................... 350/142 X Primary Examiner—James W. Lawrence
Assistant Examiner—Davis L. Willis
Attorney, Agent, or Firm—Milton E. Gilbert

[57] ABSTRACT

A stereo viewer in which a pair of rotating lenses are mounted to be simultaneously rotated to view a pair of stereo image strips, the lenses being rotated on their first principal axis or nodal point. The stereo film pair mount or film mount holder is mounted with four degrees of adjustment in focusing. The mechanisms for focusing, rotating the lenses, swinging the film mount and horizontal movement of the mount are all conveniently arranged for operating by the fingers of the hands. A light source is provided with the light passing through a diffusion plate of such width and length and in a flat plate form so that illumination is provided throughout the arc of the film. The viewer is further provided with winged hand grip portions such that when the viewer is hand held light is prevented from degrading the view and no distraction is afforded to the subject matter of the image being viewed. The light source is contained in an illumination compartment which can be readily removed from the viewer leaving the diffusion plate so that the viewer can still be used by aiming it towards a source of light.

10 Claims, 15 Drawing Figures

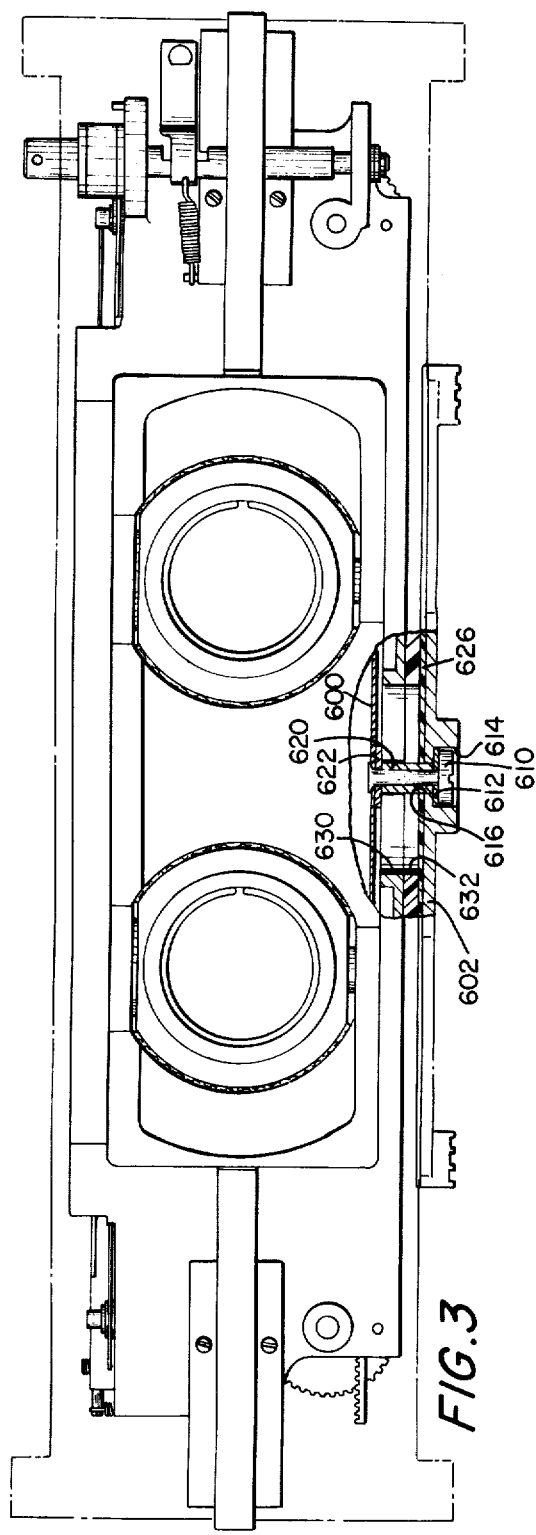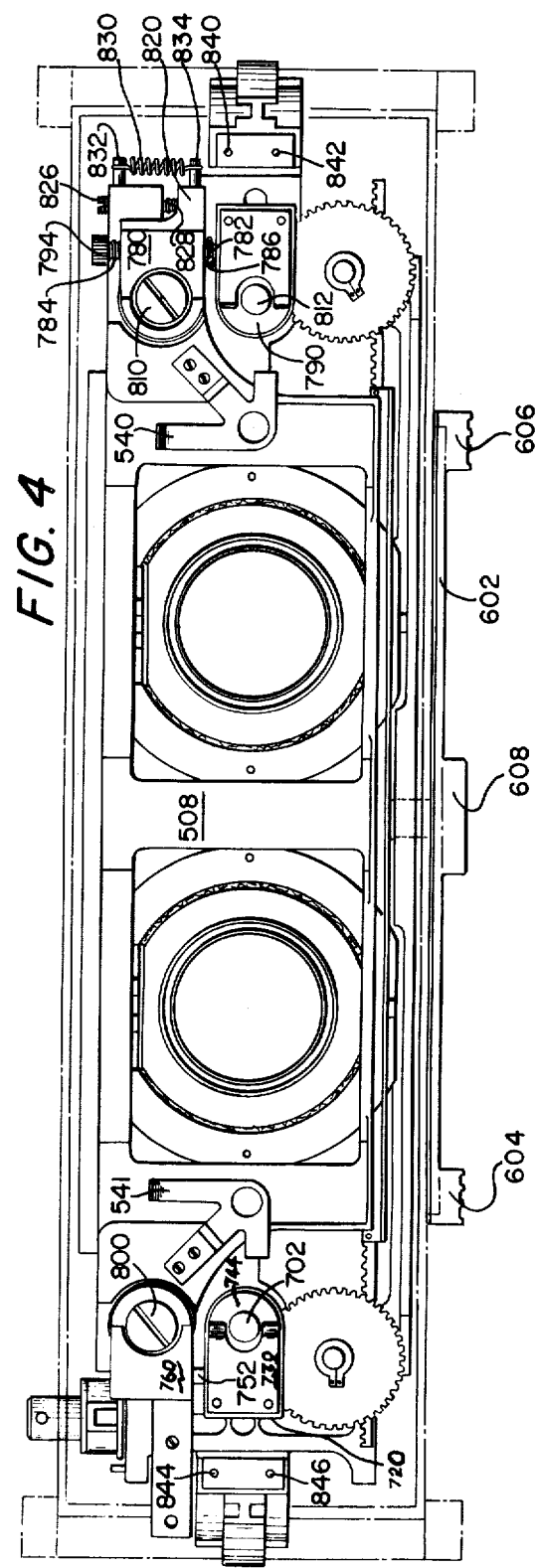

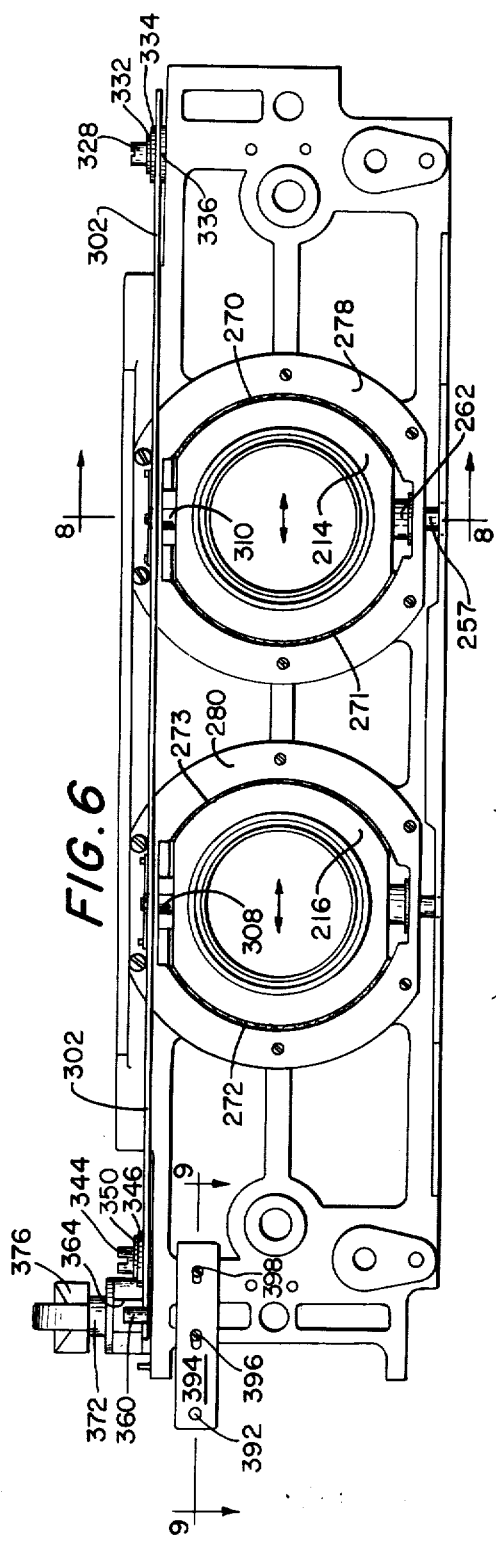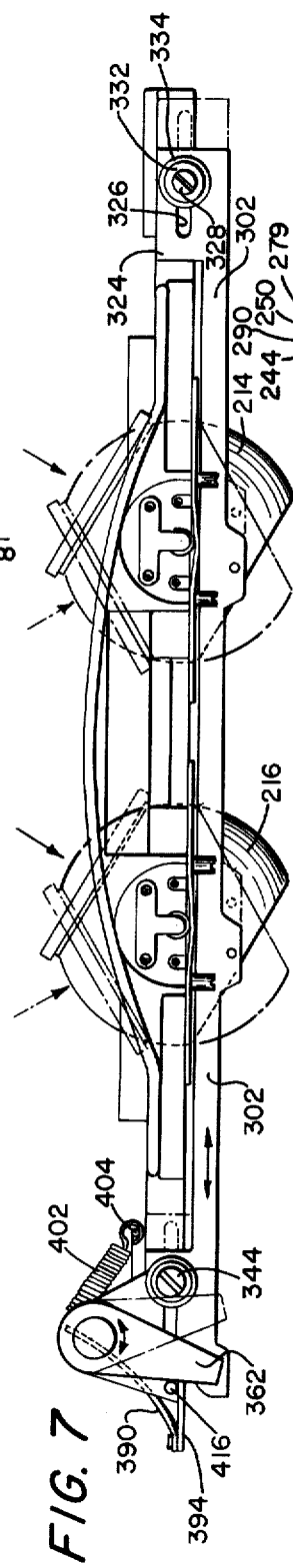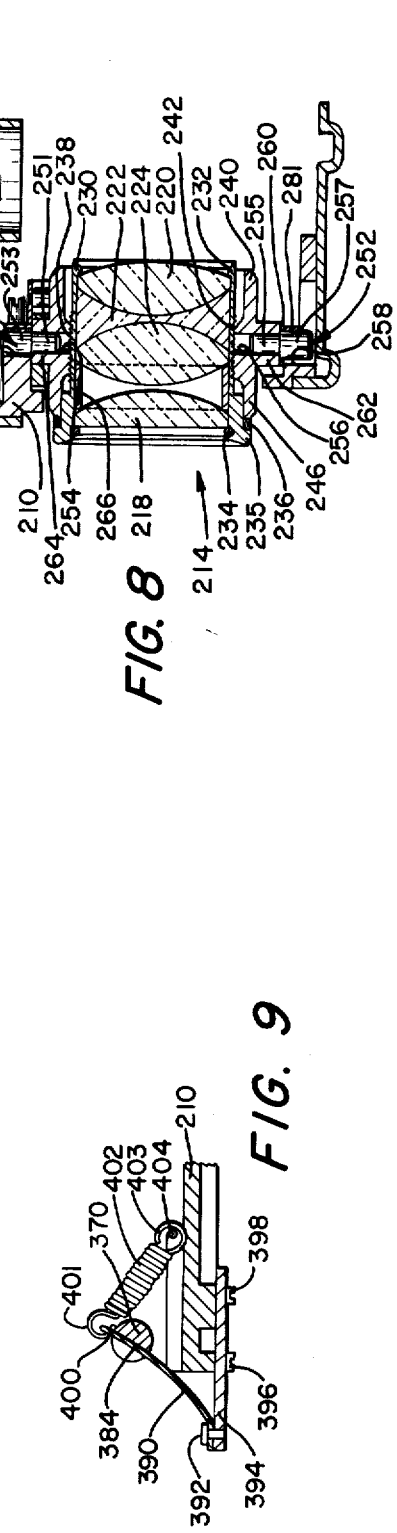

STEREO VIEWER FOR A PAIR OF ARCUATE STEREO IMAGE STRIPS

BACKGROUND OF INVENTION

Stereo image viewers have been known in which the image frame pairs have been viewed in planar relationship in much the same way as in individual mono image viewers. No stereo image viewers have been known in which the image pairs have been held in a cylindrical plane and in which a pair of viewing lenses are rotated on their first principal axis.

DRAWINGS

FIG. 3 is a cross-sectional view taken along line 3—3 of FIG. 2;

FIG. 4 is a cross-section view taken along line 4—4 of FIG. 2;

FIG. 5b is a rear view of the diffuser assembly of FIG. 5a;

FIG. 6 is a front view of a sub-assembly of the viewer housing with the eyepieces assembled;

FIG. 7 is a top view of the sub-assembly shown in FIG. 6;

FIG. 8 is a cross sectional view taken along line 8—8 of FIG. 6 and including portions of the upper and lower viewer case;

FIG. 9 is a cross sectional view taken along line 9—9 of FIG. 6;

DETAILED DESCRIPTION OF THE INVENTION

Figure 1:
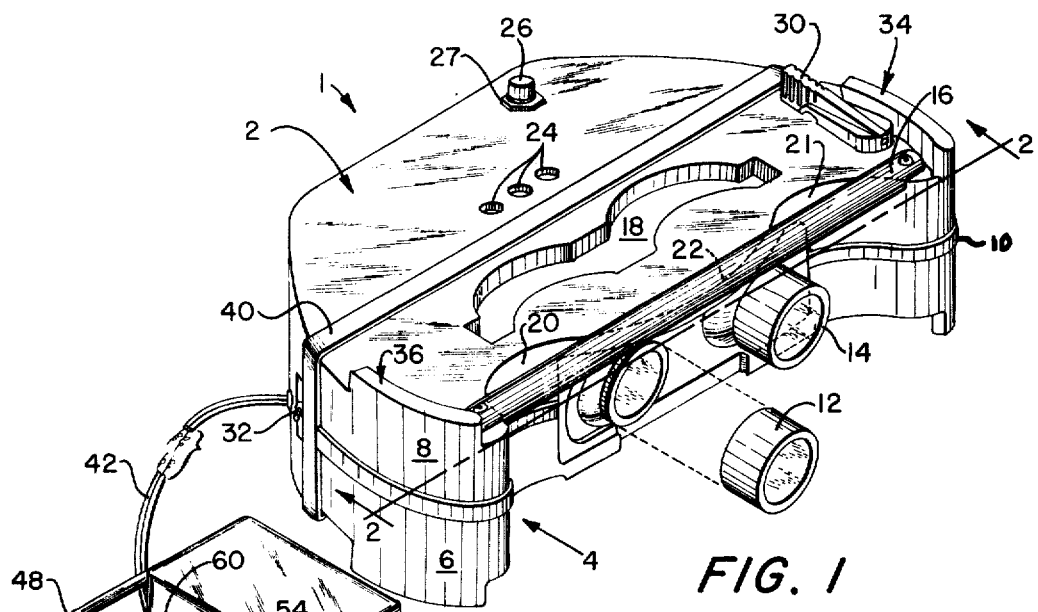
FIG. 1 is a perspective view of the viewer of the invention, partly in exploded form.

The viewer 1 is generally shown in FIG. 1, and is comprised of two main sections, a rear lamp compartment 2 and a viewer compartment 4. The viewer is comprised of a lower 6 and an upper 8 viewer housing case, with an overlapping flange 10 at the joinder area of the two housing cases.

Mounted at the front of the viewer are a pair of lenses, a left lens 12 and a right lens 14. A forehead rest bar 16 is provided which is fitted into the upper viewer housing case. An opening 18 is formed in the upper surface of the upper viewer housing case to permit the passage of a film mount. The front part of the upper viewer housing case is formed in a doubly curved manner as at 20, 21 and 22. In the event the forehead rest bar 16 is omitted then the portion 22 would serve as the forehead rest portion in order to rest the viewer firmly.

The illumination compartment 2 is provided with the openings 24 to permit heat to be dissipated from the lamp and also a starter switch 26, held by the nut 27, to turn the lamp on and off. The lenses are rotated by operation of the lever 30 to permit viewing of the extremities of the slide.

Releasable fastening means 32 are provided to interconnect the front and rear compartments. The upper and lower viewer case housings are formed into extended handgrip portions as at 34 and 36. Located between the lumination compartment 2 and the viewer compartment 4 is the diffuser casting 40. This casting serves to permit assembly of the forward viewer assembly to the rear lamp compartment.

Extending from the illumination compartment 2 is an extension cord 42 which has ordinary electrical plug 44 for connection into any ordinary electrical supply circuit. Intermediate the cord 42 is located a ballast compartment 46 which consists of a light ballast 58 within a housing. The ballast 58 may be any commercially available unit such as that made by General Electric under Catalog No. 89G435. The ballast housing comprises two covers, an upper 54 and a lower 56, which have the slots 51, 52, 53 and 55 formed in outer flanges 60 and 62, respectively. O-rings 48 and 50 fit within the slots which serve as binders to hold the housing together and also serve as bumpers to prevent damage to the ballast. A phenolic sheet or other insulator 63 is used to prevent metal contact between the housing and the ballast. Similarly insulated bushings and screws are used in the ballast itself. The ballast mentioned above would be a typical installation for a six watt, six inch fluorescent tube. Obviously other size ballasts would be employed for different power tubes.

Figure 2:
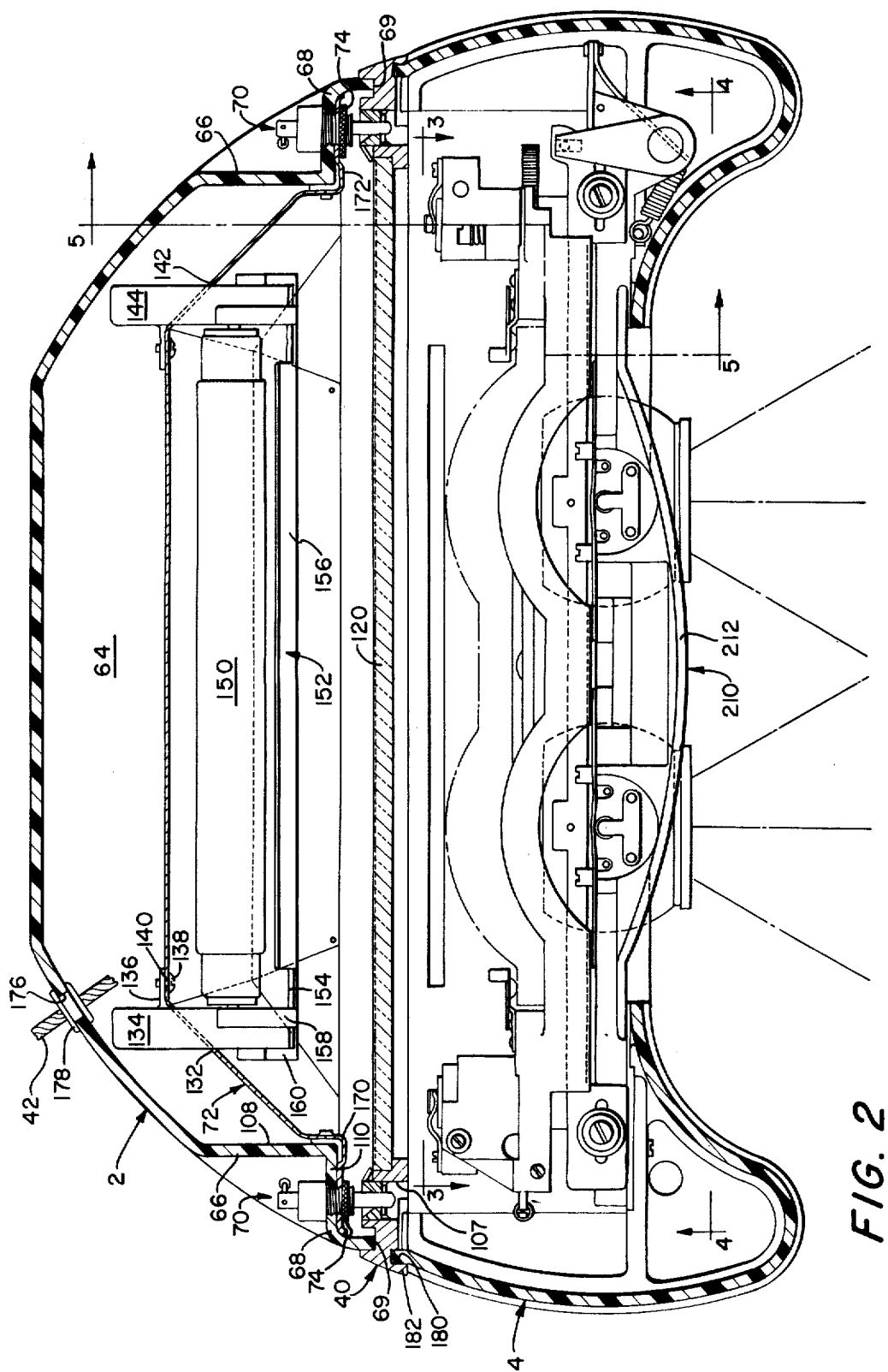
FIG. 2 is a cross-sectional view taken from a cutting plane extending horizontally through the viewer.

Referring now to FIG. 2 it is seen that within the illumination compartment 2 there is the chamber 64. The wall 66 of the compartment 2 is formed with an offset portion 68 on each side and terminating in an end surface 69. The structure is the same on both sides and reference will now be made to the construction shown on the left side of FIG. 2 and in more greater detail in FIG. 13.

The offset portion 68 of the wall 66 is formed into portions 108 and 110 at right angles to one another. A fastening mechanism 70 is provided within the opening provided by the portions 108 and 110. This permits the fastening mechanism to be confined within the outlines of the housing case. The surface 69 bears against a diffuser casting 40. A reflector 72 is retained by the fastening mechanisms 70 against the surface 110 by the knurled nut 74 which is internally threaded and mounted upon the threads 93 of a fitting 102.

A shaft 76 is provided with a hole 78 at its upper end. Pressed into the hole 78 is an arm 80 having the reduced tang portion 82 which fits into the hole 78 and a knob 84 to enable ready manipulation. The lower portion of shaft 76 is of a reduced diameter 86 to provide a shoulder 88 therebetween. The lower portion of the shaft section 86 is provided with a hole 90 into which is pressed a retaining pin 92.

Figure 13:
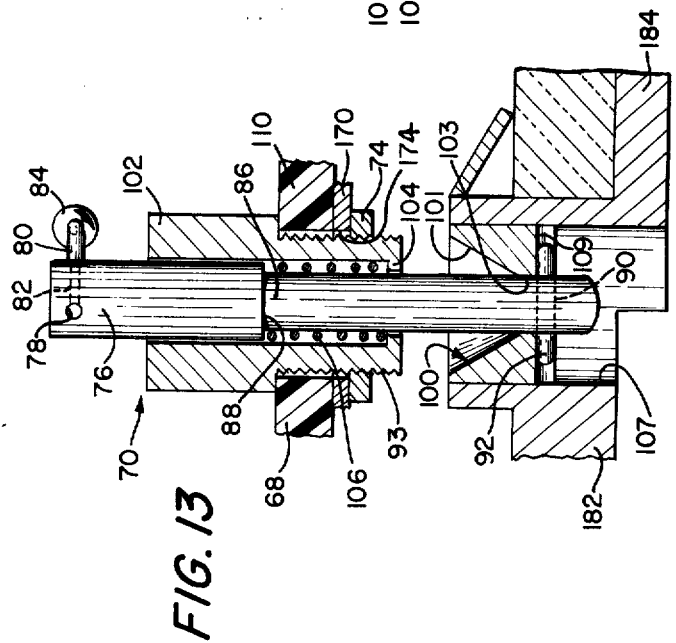
FIG. 13 is a cross-sectional view of the illumination compartment fastener mechanism.

The diffuser casting 40 is provided with an outer flange 182 and a boss 184, into which is formed a counter bore 107. The upper portion of the flange 182 as viewed in FIG. 13 is provided with a fitting 100 formed centrally with the conical bore 101 leading to a central through bore 103.

A fitting 102 is provided to receive the shaft 76. This fitting is hollow and provided with a lower inwardly extending flange or shoulder 104. A spring 106 is captured between the shoulder 88 and the flange 104. This spring serves to normally urge the shaft 76 upwardly.

The lower portion of the fitting 100 has a slot 105 formed transversely thereof. It is thus seen that when the shaft 76 is pushed in, the pin 92 will be enabled to pass through the slot 105 to reach the back of the fitting 100. Then by rotating the shaft 76 by manipulation of the knob 84 the pin 92 can be positioned within a recess 109 (see FIG. 5b) which may preferably be at right angles to the slot 105. Since the recess 109 does not go all the way through the fitting 100, whereas the slot does, it is readily seen that the spring 106 will serve to retain the pin 92 within the recess 109 when the pin is so positioned, and thus hold the light compartment 2 in assembled position. It is obvious that if desired the fitting 100 can be integral with the casting 40.

Figure 5:
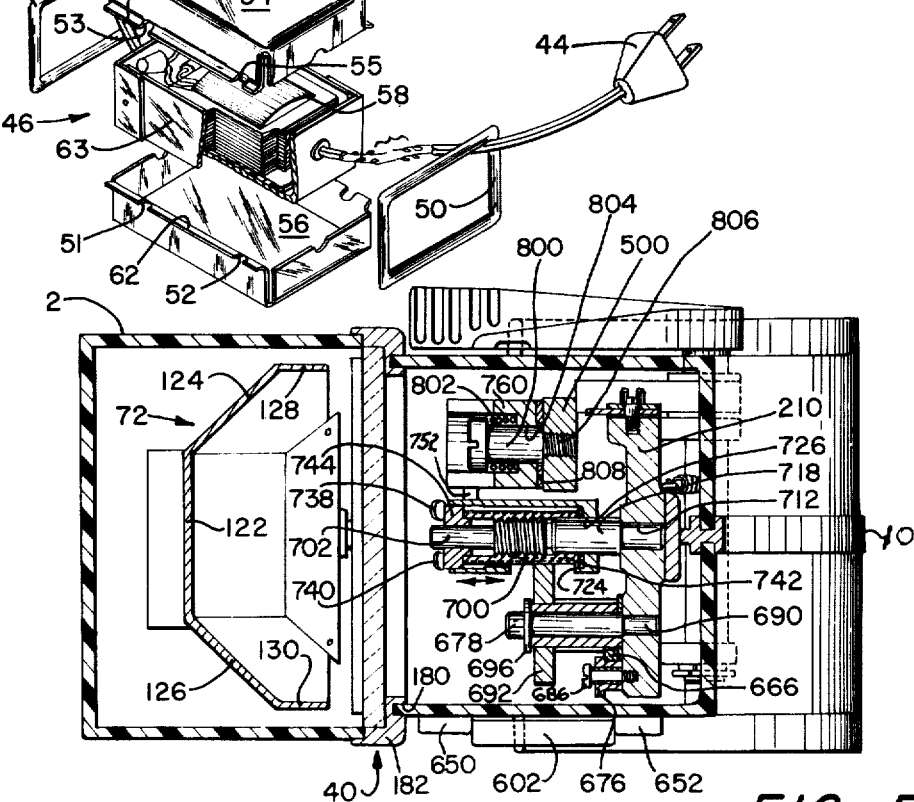
FIG. 5 is a cross sectional view taken along line 5—5 of FIG. 2.

As indicated above, the nut 74, in addition to locking the assembly 70 to the wall 110 also retains or fastens the reflector 72 within the illumination compartment. FIGS. 2 and 5 illustrate the nature of the reflector. The reflector is formed into a plurality of surfaces in order to provide uniformity of illumination across the expanse of the diffuser glass 120. As indicated in the cross-sectional view of FIG. 5, the reflector is formed into a rear vertical wall 122, an upper angled wall 124, a lower angled wall 126, an upper horizontal wall 128 and a lower horizontal wall 130. At the ends of the reflector there are bent over portions to generally conform to the configuration of the illumination compartment and to encompass the ends of the bulb, the angles being appropriately chosen so as to reflect the higher illumination at the end of bulb into the diffuser, thereby providing for more fused distribution of light.

An opening 132 is provided in one end wall, and an opening 142 is provided in the other end wall to permit for the passage of ceramic contact terminals 134 and 144, respectively, which also serve as the lamp holder for the bulb 150. A 4 watt fluorescent bulb could be used. The lamp holder 134 is provided with a bracket 136 which permits fastening to the reflector by means of a screw 138 threaded into the hole 140 in the reflector.

A front baffle plate 152 is provided to cut down the hot spot which occurs as a result of the bulb not being sufficiently long to span the full length of the diffusing plate. The bulb would cause the diffusing plate to appear hotter or brighter in the center than at the edges. With the baffle in position the hot spot is cut down in the center area of the diffusing plate causing the light to be more even throughout the length of the longer baffle plate. A rib 154 is formed centrally of the curved baffle plate which has two reflector wings such as 156 extending in curved fashion away from the central rib. The ends of the central rib are formed into retainer leg guide brackets, such as at 158, which position the baffle plate on each of the lamp holders, and grasping legs such as 160 which engage a little extending tab (not shown) formed on the lamp holder, 134.

The diffuser 72 is bent over at its ends and formed into an ear 170 and an ear 172, each ear being formed with a hole, such as 174 to permit the passage of the fitting 102 (see FIG. 13).

The wall 66 of the illumination compartment is provided with an opening 176 into which a grommet 178 is fitted to permit the passage of the extension cord 42.

Figure 5A:
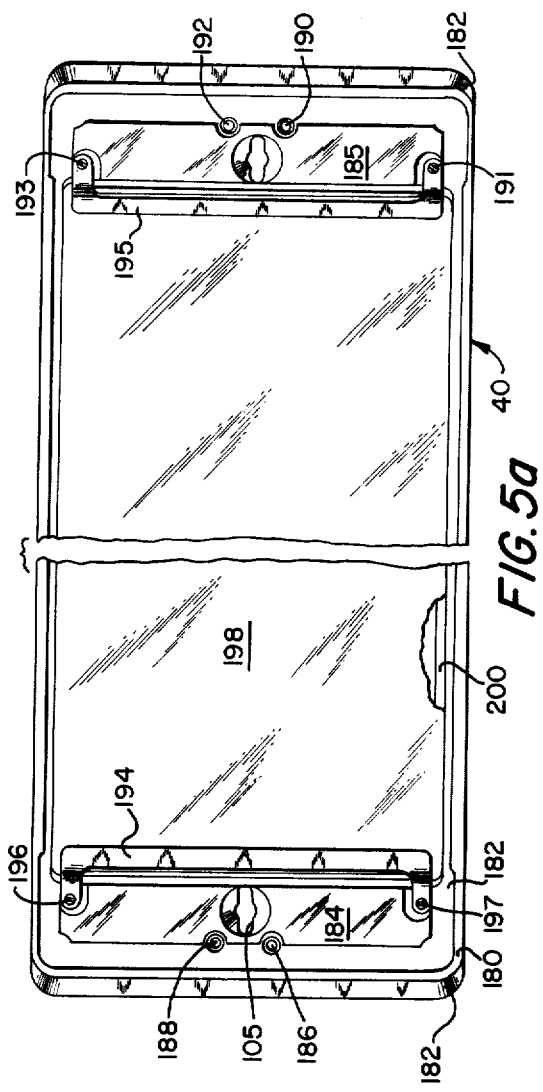
FIG. 5a is a front view of the diffuser assembly of the viewer.
Figure 5B:
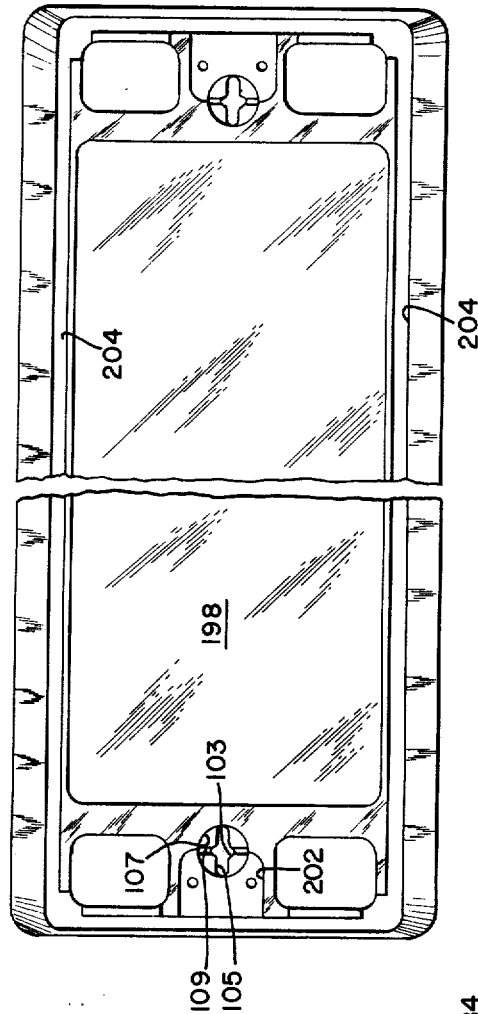

The diffusion plate casting 40 is shown in more detail in FIGS. 5a and 5b. A groove 180 is formed traversing the entire inner portion of the casting within the outer wall or flange 182. On the outer edges are provided the bosses 184 and 185. The boss 184 is provided with the counterbored holes 186 and 188, and the boss 185 is provided with the counterbored holes 190 and 192, to provide for the fastening of the diffusion plate 198 to the hand grip portions of the viewer housing. A retainer bracket 194 is mounted upon the boss 184 as by the threaded fastenings 196 and 197. Similarly a retainer bracket 195 is mounted upon the boss 185 by the threaded fastenings 191 and 193. The diffuser plate would preferably be of opal glass or of a milk glass nature. The plate 198 rests against a stepped portion or ledge 200. The underside of the casting 40 is counterbored in the area 202 to mate with a portion of the viewer housing and grooves 204 are provided to accept the upper and lower portions 6, 8 of the housing.

Figure 10:
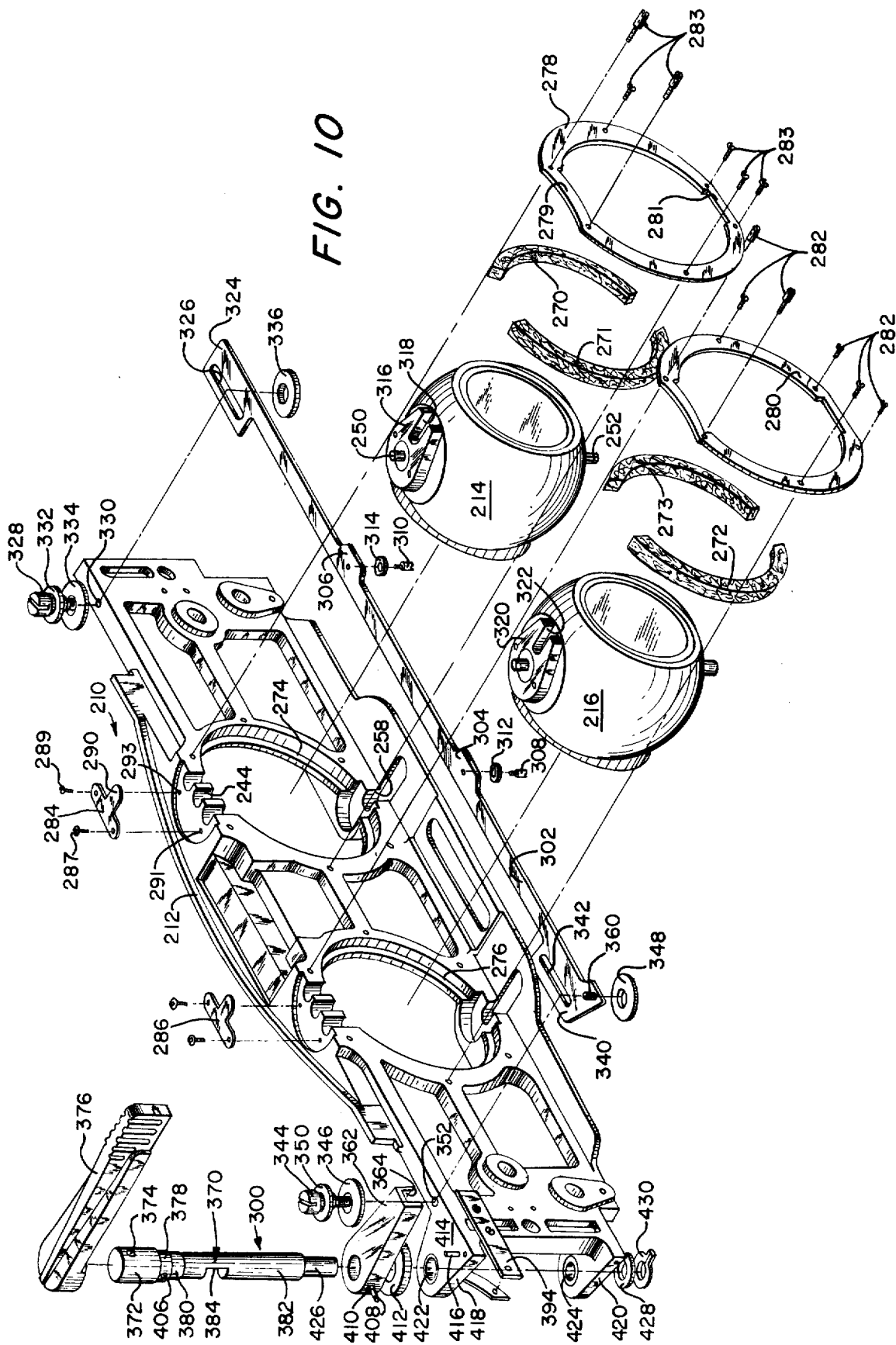
FIG. 10 is an exploded perspective view of the internal viewer mechanism, including eyepieces.

As shown more clearly in FIG. 10, the main casting 210 serves as the means for mounting the main operating elements of the viewer. The casting is generally arcuately curved in the area 212 to conform to the general shape of the viewer case. A pair of lenses, or a left spherical eyepiece assembly 214 and a right spherical eyepiece assembly 216 are provided for mounting into the casting 210. Although not shown in detail in FIG. 10, each eyepiece assembly may preferably have four lens elements mounted therein, three of which are integral and one being separated therefrom by a spacer. These elements are shown in FIG. 8, wherein the eyepiece assembly 214 is shown in cross-sectional view. Thus, the lenses 220, 222 and 224 are cemented together and held in spaced relationship by the spacer member 266 from the lens 218. All of the lenses and spacer are mounted within a cylindrical cell 230 which has an inwardly turned flange 232 to retain the cemented lenses 220, 222 and 224 at one end and a snap ring 234 at the other end bearing against the lens 218, and fitting within a groove in the cylindrical cell 230. The cell 230 is provided with an external flange 235 against which a lens cell adjustment ring 236 is located. The width of the ring 236 is important in that it serves to insure that the cell is tightened securely into the eyepiece assembly. The first nodal point of the system falls on the pivot axis of the eyepiece, or is required to be so coincident, for proper viewing of the images. Adjustment of the location of the first nodal point of the lens system with respect to the pivot axis of the eyepiece 240 is obtained by an adjustment means. This adjustment means is provided by the threads 238 on the external surface of the cylindrical lens cell 230 and the mating threads 242 on the eyepiece 240. Hence, by rotating the cylindrical cell 230 by grasping the flange 235, the first principal axis of the lens system can be made to be coincident with the axis of rotation of the eyepiece 240. To accomplish this the thickness of the eyepiece cell adjustment ring 236 becomes critical since upon such adjustment the ring will be held between the flange 235 and a flange 246 on the eyepiece 240.

The eyepiece 240 is provided with an upper, 250, and a lower, 252 pivot shaft for mounting and rotational purposes. These shafts are pressed into holes 254 and 256, respectively, in the eyepiece. The pivot shaft 250 is formed with a lower tenon portion 251, which is pressed into the hole 254, and an upper enlarged portion 253. Similarly, the pivot shaft 252 is formed with the tenon portion 255, which is pressed into the hole 256, and an enlarged portion 257. The holes 254 and 256 are respectively formed into the bosses 264 and 262, respectively, of the eyepiece. A friction-free teflon washer 260 is located below the boss 262.

As indicated above, it is desired that the axes of the pivot shafts 250 and 252 are adjusted to be coincident with the first principal axis of the lens system. The reason for this is so that when the lenses are rotated and viewed therethrough the images will not appear to shift right or left. If the lens is not so located on its first principal axis, the film mount 502 would appear to shift right and left as the lenses were rotated by the mechanism described hereinafter, which would give an unnatural effect.

The viewer mechanism casting or housing 210 is provided with a slot 258 into which the enlarged portion 257 of the shaft 252 can project and it is held there by a spring mounting described hereinafter in order to prevent any movement of the shaft. The enlarged portion 253 of the upper pivot shaft 250 fits within a slot 244 in the housing 210.

The felt strips 270 and 271, and the felt strips 272 and 273 serve as light traps for the left and right eyepiece assemblies 214 and 216, respectively. These strips are placed on the stepped portions 274 and 276, respectively, in the housing 210. Mounted over these strips are the eyepiece and light trap strip retainers 278 and 280, respectively. These retainers serve to provide pressure against the upper and lower shafts of the eyepieces to keep such shafts tightly in their respective slots. A series of screw fastenings 283 serve to assemble the retainer 278 into mating holes in the housing 210; and a series of fasteners 282 serve to assemble the retainer 280 in the housing 10. The portion 281 of the retainer 278 presses against the shaft portion 257 to retain it firmly in place as shown in FIGS. 8 and 10. The shaft of the right eyepiece assembly 216 is similarly retained in place by the retainer 280. The portion 279 pressese against shaft portion 253.

T-shaped springs 284 and 286 are respectively provided to vertically retain the eyepiece pivot shafts of the assemblies 214 and 216 in position. As shown in FIG. 10, the spring 284 is held in position by a pair of screws 287 and 289 fastened into the holes 291 and 293 in the housing 210. The spring leg portion 290 of the pivot shaft spring 284 exerts downward pressure on the shaft 250. It is desireable that the axes of both lens assemblies be equidistant from the base of the viewer and also from the base of the film images so that a line through the axes, horizontally, of both lens assemblies will be parallel to a line through the centers of the film image pair. If this relationship is assured then there will be no vertical tilting or displacement of the images when viewed. The use of the two spring elements 284 and 286 accomplishes this alignment.

As indicated heretofore the lens assemblies 214, 216 are rotated about the vertical axes of the pivot shafts 250 and 252. The mechanism for accomplishing this motion and providing for the scanning of the images is shown in FIG. 10 in exploded perspective. The scanning mechanism is shown generally at 300 and includes the bar 302 with a rotatable shaft to linearly actuate it. The bar or scanning arm 302 is a generally elongated flat member and is provided with a pair of enlarged areas 304 and 306 intermediate its ends. Into the enlarged areas 304, 306 are pressed or riveted the pins 308 and 310, respectively. Spacers 312 and 314 are placed over the pins and act as thrust washers, as shown. Boss 316 on the left spherical eyepiece assembly 214 is provided with an elongated slot 318, and the boss 320 on the eyepiece assembly 216 is provided with the elongated slot 322. The pins 310 and 308 respectively slide in the slots 318 and 322 so that the arm 302 can be reciprocated and the lenses can be simultaneously rotated about their respective axes.

At one end of the arm 302 there is the enlarged portion 324 which is provided with an elongated slot 326, and similarly the enlarged portion 340 at the other end is provided with the elongated slot 342. The slots 326 and 342 serve as guides to permit the arm 302 to travel in a straight line. A shoulder screw 328 passes through the slot 326 and is threaded into a tapped hole 330 in the housing 210. The teflon washers 332 and 334 are placed above and below the arm 302 and a metal washer 336 is located between the lower washer 334 and the surface of the housing 210. In this manner there is formed a guiding means for the reciprocating movement. At the other end of the arm 302 the shoulder screw 344 is provided together with the teflon washers 350 and 346, and the metal washer 348 to form a similar guiding means when the screw 344 is threaded into the tapped hole 352. Riveted into the arm 302 in the enlarged area 340 is a pin 360 which projects upwardly from the arm 302 in the opposite direction from the pins 308 and 310. The pin 360 cooperates with a scanning arm link 362 by riding in the slot 364 located on the underside of the arm link. The arm link 362 in turn is mounted upon the shaft 370. The shaft 370 is formed with an enlarged upper end 372 which has a hole 374 formed therein. The handle or lever 376 is mounted upon the end 372 of the shaft 370 by means of a set screw which enters the hole 374. The shaft 370 is further provided with a first reduced area 378, a second reduced area 380, a third central area 382 and a lower reduced portion 426. The central area 382 is provided with a slot or cutaway portion 384 centrally thereof against which the flat spring 390 rests normally as shown in FIG. 9. The spring 390 is riveted at 392 to a plate 394 which in turn is fastened by a pair of screws 396, 398 to the housing 210. The other end of the spring 390 is provided with a hole 400 into which one end of a coiled spring 402 is fitted as shown at 401. The other end 403 is anchored around a pin 404 which is pressed into the housing 210. The arrangement of the spring 390 urges the shaft 370 into a neutral position with the axes of the eyepieces held perpendicular to the general configuration of the film mount.

The scanning arm link 362 is mounted on the first reduced area 378 by means of a pin 408 passing through the hole 410 in the link 362 and into the hole 406 in the shaft. Spacer member 412 is mounted on the second reduced area 380 of the shaft 370, and this spacer rests upon surface 414 of the housing 210. A limit pin 416 is pressed into the surface 414 in order to limit the motion in one direction of rotation of the scanning arm link. Motion of the scanning arm link in the other direction is limited by the head of the shoulder screw 344. FIG. 7 shows these two positions with the limit against the pin 416 being shown in solid lines and the limit against shoulder screw 344 being shown in dotted lines.

Housing 210 is formed with the two wings 418 and 420. The upper wing 418 is provided with the hole 422, and the lower wing 420 is provided with the hole 424. The shaft 370 passes through the holes 422 and 424, and the lower reduced portion 426 of the shaft 370 protrudes below the wing 420, the hole 424 being of somewhat reduced diameter to accept this reduced portion 426. A washer 428 and Tru-arc retainer 430 are used to snugly retain the shaft and its assembled scanning mechanism operating parts in position.

Figure 11:
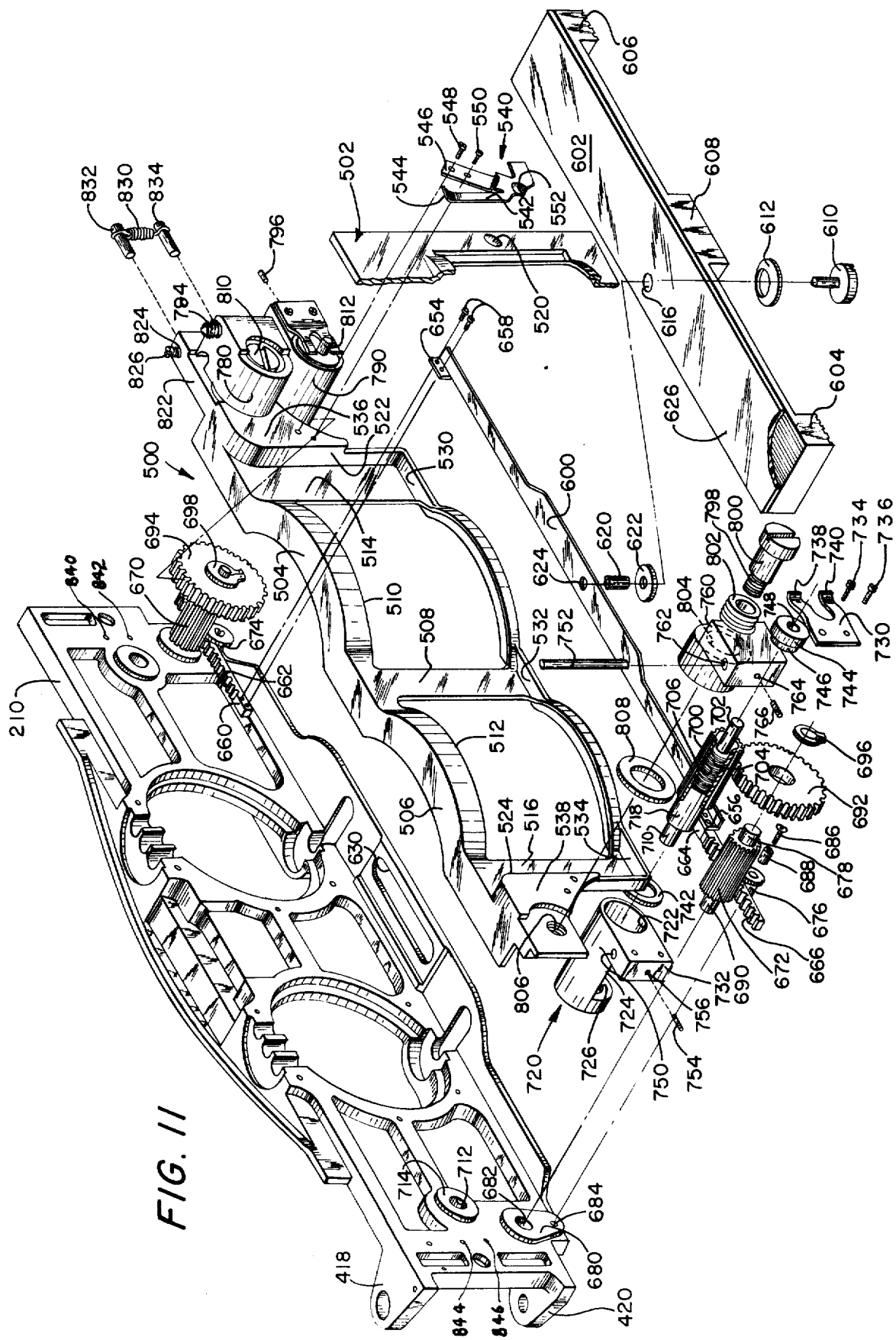
FIG. 11 is an exploded perspective view of the focusing mechanism.

As shown in FIG. 11, a film mount holder 500 is intended to receive a film mount 502 for viewing. The mount holder 500 is generally formed with a right and left curved bridge 504 and 506 respectively. These bridges are provided to bridge over the spherical eyepiece assemblies. Also this curved shape closely parallels that of the film mount and therefore prevent light from leaking around the images held on the film mount. The film mount holder 500 is formed with a central rib 508 and side ribs 514 and 516 to provide the two window openings 510 and 512. The film mount 502 rests against these several ribs when inserted into the viewer. The curved surfaces 522 and 524 serve as right and left guide surfaces for the film mount which is simply dropped into the film mount holder. The film mount holder 500 is provided with the lower ledges 530, 532 and 534 against which the lower surface of the film mount rests. The film mount holder 500 is provided with the boss 536 on the right side and the boss 538 on the left side (see FIGS. 4 and 11). A pair of springs 540 and 541 are mounted to these bosses, respectively, to retain the film mount against outward movement. The nature of the springs is particularly shown in FIG. 11 where spring 540 is shown in detail, both springs being similarly constructed. The spring 540 is formed with an upper guide portion 542 which is bent over at the top 544 to receive and guide the film mount downward into position for viewing. The spring also is formed with a tang portion 546 through which two screws 548 and 550 pass to fasten the spring to the surface 536. Centrally of the spring is a detent boss 552 which serves to engage a complementary shaped dimple 520 on the film mount 502 to register and position the film mount in the viewer. The film mounts will thus always be registered both horizontally and vertically into the identical position for viewing.

Focusing means are provided for positioning the film mount for individual viewing by the eyes of the operator. An operating or focusing lever 602 is provided to move the film mount towards and away from the lenses. The focusing lever is formed with two downwardly extending knurled extensions 604 and 606 and a central hub 608. A screw 610 is provided to which a spring washer 612 is assembled, which screw passes through the hole 616 in the hub 608. FIG. 3 shown this mounting arrangement in cross-section. The boss 608 has an enlarged opening or counterbore 614 into which the screw 610 passes. The screw 610 is threaded into a hollow, threaded shaft 620. A teflon washer 622 is located between the end of the shaft 620 and the focusing arm 600. Upon assembly the end of the screw 610 may preferably be peened over as shown in FIG. 3. A sheet of teflon 626 is affixed to the operating lever and extends almost the full size of the focusing lever 602. This prevents galling of the surface of the lever 602 when it is operated. A slot 630 is provided in the housing 210, and a slot 632 in the lower viewer housing 6 which is of somewhat greater length than the total desired movement of the lever 602. Upon assembly the arm 600 and and the lever 602 can be moved as a unit. This unit is guided between a pair of guide ribs 650 and 652 (see FIG. 5) which are formed or molded on the underside of the lower viewer housing 6 and extend only a sufficient length to accommodate the intended movement of the unit and prevent any pivoting movement.

The operation of the focusing arm causes movement of the film mount holder 500 towards and away from the lens assemblies as previously noted. To accomplish this the arm 600 is provided with a right tab 654 and a left tab 656 on the ends thereof. The tab 654 has riveted to it, as by the pair of rivets 658, a rack 660 which is provided with the teeth 662. Similarly the rack 664, which is provided with the teeth 666, is riveted to the tab 656. A pinion 670 meshes with the rack teeth 662 and a pinion 672 meshes with the rack 666. Guide rollers provided with flanged heads are located below the arm 600 to keep the racks engaged with the pinions.

The housing 210 is provided with the boss 680 on its left side as viewed in FIG. 11. The boss 680 has the smooth bore 682 and a threaded hole 684, the latter being adapted to receive the screw 686 which passes through the sleeve 688. Mounted on the sleeve 688 is the roller 676, the sleeve serving as a bushing for the flanged roller. The flanged portion retains the rack so that it will be maintained in contact with the pinion 672. The shaft extension 690 of the pinion 672 is journaled in the hole 682. The pinion 670 is similarly mounted at the right end of the housing 210. A gear 692 is pressed onto a reduced portion 678 of the pinion 672 and held into position by the Tru-arc retainer 696. A gear 694 is similarly held by a retainer ring 698 on a reduced portion of the pinion 670. Thus upon linear movement of the focusing lever 602 the racks 660 and 664 will move linearly to rotate the pinions 670 and 672.

Gear 692 engages the focusing traveling pinion 700 which is in tubular form with longitudinal teeth on its outer periphery and a series of internal teeth or threads 706. The traveling pinion 700 is mounted upon the shaft 702 which is externally threaded at 704. The shaft 702 has a reduced inner end 710 which is pressed into a hole 712 formed on the boss 714 of the main housing 210. As the gear 700 is rotated by gear 692 it will advance or retract on the shaft 702 which remains fixed with respect to the housing 210. Gear 700 is also guided on the portion 718 of the shaft 702 which has a diameter greater than the root diameter of the threads 704. The focusing traveling pinion 700 is contained within a bore 722 in the fitting 720, which is cut away to form a window opening 724, and a smaller diameter bore 726. The window opening permits the gear to mesh with the focusing traveler pinion 700 as more clearly shown in FIG. 5, throughout the length of travel. The diameter of 726 is such as to accommodate the large diameter 718 of shaft 702.

A retaining spring 730 is fastened by the screws 734 and 736 onto an ear or extension 732 of the fitting 720. The spring 730 is bifurcated into two spring fingers 738 and 740 which bear against a pinion retainer 744. The retainer 744 has a portion 746 of reduced diameter which fits within the internal diameter of the focusing traveler pinion 700. The outer diameter of the retainer 744 rides within the bore 722. The fitting of the parts is such that the cylindrical fitting 720 can ride back and forth without any play since there is both a forward guide and a rearward guide means to prevent wobbling. This maintains the images in a stable position for viewing. A washer 742 also is located within the bore 722 to provide for smooth movement. The spring 730 also serves to prevent any backlash as the pinion travels back and forth. The to and fro motion of the assembly is indicated by the arrows in FIG. 5. The retainer 744 is provided with the central bore 748 of a diameter to fit over and slide upon the shaft 702.

The extension 732 has a hole 750 formed therein to receive the pin 752, which after assembly is retained in position by a set screw 754 threaded into the threaded bore 756 in the extension 732. A mount holder support block 760 is provided with a through bore 762 to permit the passage of the pin 752. A set screw 766 is threaded into the tapped bore 764 in the support block 760 to also lock the pin 752 in position. The relationship of the cylindrical fitting 720, support block 760 and pin 752 is shown in FIGS. 4, 5 and 11.

The arrangement on the right side of the film mount holder 500 is somewhat similar and is shown in FIGS. 11 and 4. Thus a right mount holder support block 780 has a pin 782, which is longer than the pin 752, and is externally threaded as at 784. A spring 786 is captured between the support block 780 and a right cylindrical fitting 790. This arrangement permits a vertical swing adjustment of the film mount holder 500 by pivoting it about the shaft 702 on the left side as viewed in FIGS. 4 and 11. The cylindrical fitting 790 has a smooth bore to receive the pin 782, and the support block 780 also has a smooth hole to accommodate the pin 782. A set screw 796 is provided for the fitting 790 to lock the pin 782 in position. The pivoting is accomplished by rotation of an internally threaded adjustment knob or head 794 on the threads 784 of the pin 782 after it is locked into position. Thereby the support block is moved towards or away from the fitting 790 to thus pivot the film mount holder 500 about the horizontal axis of the shaft 702. The spring 786 cooperates with the threaded knob 794 to assure the upward movement of the support block 780 and provided a load against which the knob works.

On the left side of the film mount holder 500 there is provided a further pivoting means to permit adjustment of the position of the stereo images. A shoulder screw 800 having a threaded end 798 has a spring 802 fitted around the shoulder portion. The screw passes through a bore 804 in the mount holder support block 760 and has a teflon washer 808 spaced between it and a tapped hole 806 in the film mount holder 500. The construction on the right side of the film mount holder 500 is similar to that on the left side. Thus a shoulder screw 810 is mounted in the right support block 780, and a right pivot shaft 812 is mounted in the right cylindrical fitting 790. The right support block 780, however, has an extension ledge 820 (see FIG. 4), and the film mount holder 500 has an overlying extension 822 juxtaposed to the extension 820. A threaded hole 824 is formed in the extension 822 in which an adjustment screw 826 can pass. The lower portion of the adjustment screw 828 bears against the extension 820. The adjustment of the screw 826 results in a horizontal movement of the film mount holder 500 by pivoting the support blocks 780 and 760 as explained in more detail hereinafter.

Figure 12:
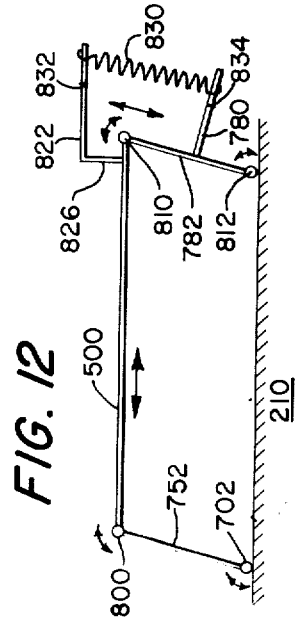
FIG. 12 is a schematic diagram of the movement of the film mount holder afforded by the viewer operating mechanism.

The motion of the adjustment mechanism is best understood by reference to FIG. 12 wherein the various members are shown in schematic form. The viewer mechanism housing is indicated as being a fixed member 210. A parallelogram movement is provided because of the linkage. The pin 752 rotates about the shaft 702, and the film mount holder 500 rotates at the left end about the shoulder screw 800 and at the right end about the shoulder screw 810. The pin 782 rotates about the right pivot shaft 812. The film mount holder 500 is thus maintained in a horizontal position at all times which can be vertically translated and linearly also moved in a translational motion horizontally, or reciprocated. The operating means to cause the motion of the film holder is formed by the rotatable pin 826. An elastic restraint is provided by a spring 830 which is mounted about the two pins 832 and 834 (see FIG. 11). The pin 832 is pressed into the extension 822 of the film mount holder 500, and the pin 834 is pressed into the extension 820 of the support block 780.

The holes 840, 842 and 844, 846 are provided on the right and left ends of the housing 210 to permit the mount of the diffusion plate holder 40 by means of the screws 192, 190 and 188, 186 respectively, (see FIGS. 5a and 11).

To assure the proper motion of the parts it is noted that the axis of the hole through which the adjustment screw or pin 782 passes must be maintained parallel to the front surface or face 536 on the film mount holder 500. Also the axis of the shaft 812 must be perpendicular to the hole through which the pin 782 passes.

Although specific features of construction have been described, as well as a preferred embodiment of the invention, it should be apparent that various modifications and rearrangements of parts can be made without departing from the spirit and scope of the invention.

What I claim is:

1. A stereo image viewer comprising, in combination:
    a housing;
    a means within said housing for receiving, positioning and holding a pair of arcuate stereo image film strips, each strip being held in a cylindrical plane for viewing;
    lens means mounted within said housing for viewing said stereo image film pair; and
    means for rotating said lens means to enable viewing all of the field of said stereo image film pair.

2. The stereo image viewer of claim 1 wherein said lens means comprises a pair of lenses and said lens rotating means is so constructed and arranged as to enable simultaneous coordinated rotation of both lenses.

3. The stereo image viewer of claim 2 wherein the lens pairs are so arranged that they are each rotated on their first principal axis.

4. The stereo image viewer of claim 1 wherein said means for receiving, positioning and holding the stereo image film pair is mounted in such manner as to provide for four degrees of adjustment for said stereo image film pair with respect to said housing.

5. The stereo image viewer of claim 1 including readily detachable light source means for illuminating said stereo image film pair.

6. The stereo image viewer of claim 5 including a light diffusion means located between said light source means and said lens means of such dimensions as to ensure substantially uniform illumination of said stereo image film pair throughout the arcuate field of the film.

7. The stereo image viewer of claim 2 wherein each lens means includes a spherical eyepiece assembly having a lens cell containing a lens system having a first nodal point, said assembly being rotationally mounted, and an adjustment means within said assembly for fixedly positioning said lens cell with respect to said rotational mounting, thereby adjusting the location of the first nodal point of the lens system with respect to the axis of rotation of said assembly.

8. The stereo image viewer of claim 4 wherein a first degree of adjustment for said stereo image film pair is provided by a focusing means mounted within said housing for bodily moving said stereo image film mount pair holding means towards and away from said lens means in a translational manner, and the remaining three degrees of adjustment are provided by a parallelogram linkage mounting for said film holding means with respect to said housing, with the housing serving as a fixed link.

9. The stereo image viewer of claim 8 wherein said means for holding said stereo image film pairs is an elongate frame member pivotally mounted at each end to said housing within support blocks and means for adjustably actuating said linkage to vertically translate and horizontally move said film holding means within a vertical plane by pivoting same within said support blocks.

10. The stereo image viewer of claim 9 wherein said means for holding said stereo image film pairs is further pivotally mounted at one end and a further means is provided at the other end for adjustably actuating said film mount holding means to pivot same in a vertical plane.

* * * * *